United States Patent [19]

Hsieh

[11] Patent Number: 5,167,466
[45] Date of Patent: Dec. 1, 1992

[54] CLAMPING APPARATUS

[76] Inventor: Wu H. Hsieh, No. 162, Cungshan Erh Rd., Luchou Hsiang, Taipei Hsien, Taiwan

[21] Appl. No.: 831,688

[22] Filed: Feb. 5, 1992

[51] Int. Cl.$^5$ .............................................. B25G 3/36
[52] U.S. Cl. .................................. 403/385; 403/400; 403/97
[58] Field of Search ................ 403/385, 389, 400, 97

[56] References Cited

U.S. PATENT DOCUMENTS

| | | | |
|---|---|---|---|
| 3,495,857 | 2/1970 | Hawke et al. | 403/97 X |
| 3,937,451 | 2/1976 | DiPaola | 403/385 X |
| 4,946,122 | 8/1990 | Ramsey et al. | 403/385 X |
| 5,017,038 | 5/1991 | Kurosaki | 403/400 X |

FOREIGN PATENT DOCUMENTS

| | | | |
|---|---|---|---|
| 1171137 | 9/1958 | France | 403/385 |
| 502334 | 11/1954 | Italy | 403/97 |

Primary Examiner—Andrew V. Kundrat
Attorney, Agent, or Firm—Hedman, Gibson & Costigan

[57] ABSTRACT

A clamping apparatus has a first clamping device, a second clamping device, and a coupling device engaged therebetween. The first clamping device has a cylindrical socket extending therefrom and the second clamping device has a threaded flange portion extending therefrom. The coupling device is ring-shaped and has a innerly threaded receiving hole formed in one side thereof and a through hole formed in another side thereof, the two holes communicating with each other. The cylindrical socket of the first clamping device is inserted into the through hole of the coupling device while the threaded flange portion of the second clamping device is inserted into the receiving hole of the coupling device, thereby engaging the first clamping device and the second clamping device together and maintaining a specific axial relationship therebetween. The axial relationship of the first clamping device and the second clamping device is adjustable to another bearing relation.

9 Claims, 6 Drawing Sheets

CLAMPING APPARATUS

BACKGROUND OF THE INVENTION

The present invention relates to a clamping apparatus, especially to one which is used to hold musical instruments.

For performing a percussion instrument such as a drum set, the percussionist has to adjust the position of each drum and cymbal in order to obtain an optimal position to perform.

A conventional clamping apparatus for this positioning is shown in FIG. 6, and has a first holder 71 for clamping to a frame post and a second holder 72 for clamping to another frame post. The spatial relation of the first holder 71 and the second holder 72 are perpendicular to each other, and they have a constant angle therebetween. However, a longitudinal angle between the two holders 71 and 72 is constant, limiting the adjustability for different percussionists.

SUMMARY OF THE INVENTION

It is an object of the present invention to provide an adjustable clamping apparatus which generates a variety of spatial relationships.

Additional objects, if not set forth specifically herein, will be readily apparent to those skilled in the art from the detailed description provided hereunder, with appropriate reference to the accompanying drawings.

DETAIL DESCRIPTION OF THE PREFERRED EMBODIMENTS

Figure 1:
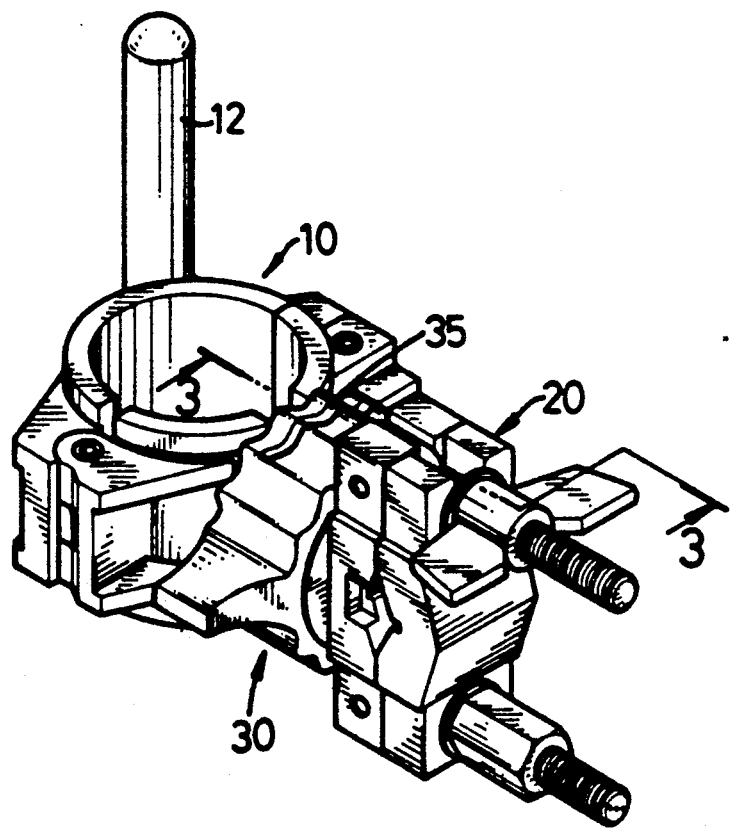
FIG. 1 is a perspective view of a clamping apparatus of a preferred embodiment in accordance with the present invention.

Referring to FIG. 1, a first embodiment of a clamping apparatus of this invention is shown. The clamping apparatus comprises a first clamping means 10, a second clamping means 20, and a coupling means 30. The first clamping means 10 and the second clamping means 20 are used to hold a post or column of a percussion frame or instrument. The coupling means 30 is used to couple the first clamping means 10 and the second clamping means 20 together and adjust a longitudinal bearing (angular relationship) therebetween.

Figure 2:
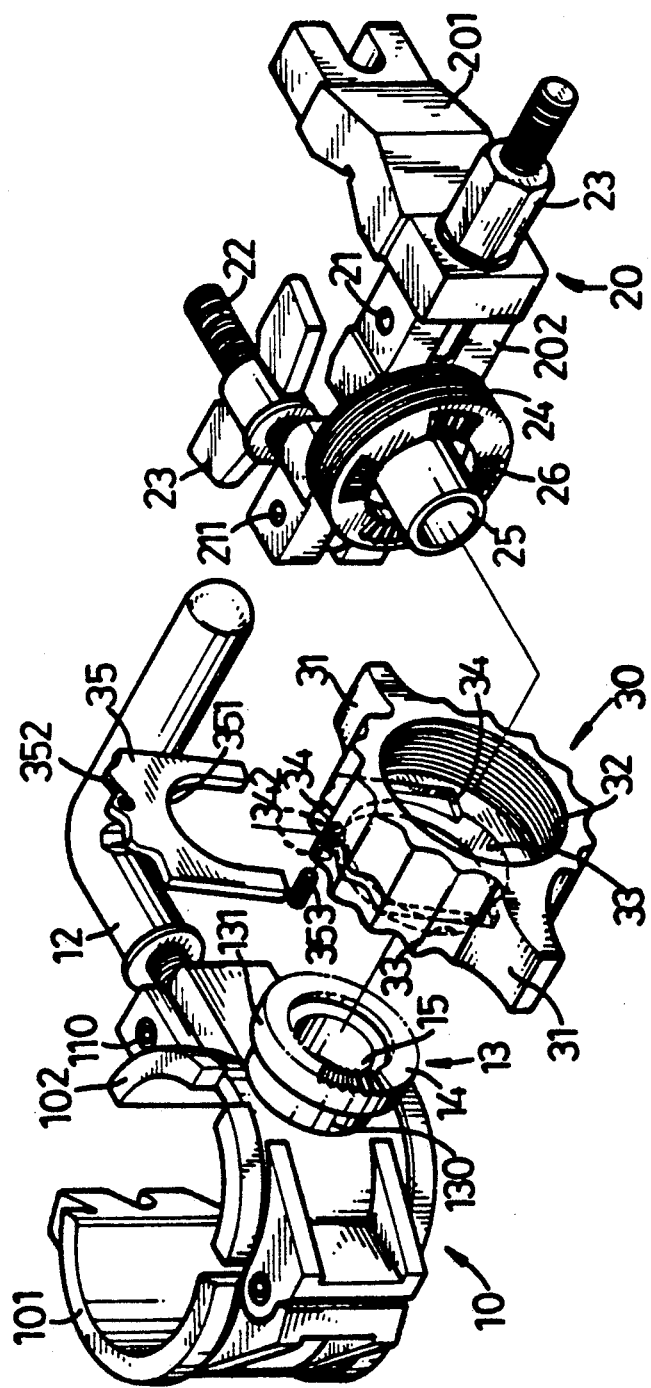
FIG. 2 is an exploded view of the clamping apparatus.

FIG. 2 shows a detailed structure of the clamping apparatus. The first clamping means 10 comprises a first and a second semicircular member 101 and 102 with a pivot shaft 11 engaged in one end of each semicircular member for, providing a pivotal relationship therebetween. A first pivot pin 110 is embedded inside the other end of the second semicircular member 102 for pivotally attaching an L-shaped clamp lever 12 thereto which is used to close and secure the two semicircular members 101 and 102 around a post (not shown) therein. A cylindrical socket 13 transversely extends from an outer central portion of the second clamping member 102 and includes a neck portion 130 and a flange portion 131. The cylindrical socket 13 defines a chamber 15 in a longitudinal central part thereof and has a plurality of teeth 14 formed in an end periphery of the flange portion 131.

The second clamping means 20 comprises a first and a second V-shaped members 201 and 202 (actually they have a V-shaped midportion), with a second and a third pivot pin 21 and 211 formed in both ends of the second V-shaped member 202 which provides pivotal movement with two clamping levers 22 and 23, respectively, so as to clamp around a post (not shown). A threaded flange portion 24 extends outward from a wall portion of the second V-shaped member 202. The threaded flange portion 24 has a plurality of teeth 26, which are separated into four banks, formed in an end periphery thereof. A protruding tube 25 concentrically extends from the threaded flange portion 24 and has a diameter less than that of the chamber 15 of the cylindrical socket 13 so as to be receivable therein.

Referring to FIG. 2, the coupling means 30 is ring-shaped with one side thereof formed as a receiving hole 32 which is internally threaded for receiving and engaging with the threaded flange portion 24 of the second clamping means 20, and with the other side thereof formed as a through hole 33 for substantially receiving therein the cylindrical socket 13 of the first clamping means 10, thereby coupling the first clamping means 10 and the second clamping means 20 together. The depth of the coupling means 30 is designed such that when the cylindrical socket 13 is inserted through the through hole 33 and the threaded flange portion 24 is screwed into the receiving hole 32, the tube 25 is received in the chamber 15 of the cylindrical socket means 13, the neck portion 130 thereof being contained within the coupling means 30.

A slot 34 is formed in a side wall of the coupling means 30 just to an inside of the through hole 33. A blocking plate 35 has a small threaded hole 352 in an upper portion thereof and a U-shaped cutout 351. The blocking plate 35 is insertable into the slot 34. The U-shaped cutout 351 has a diameter larger than that of the neck portion 130 and smaller than that of the flange portion 131, such that when the cylindrical socket 13 is inserted into the coupling means 3, the blocking plate 35 is received in the socket 351 and, the U-shaped cutout 351 fits around the neck portion 130 while blocking or retaining the flange portion 131.

Figure 3:
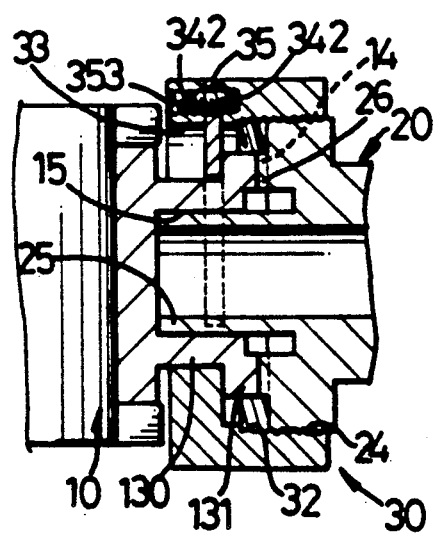
FIG. 3 is a cut-away cross-sectional view taken along from line 3—3 of FIG. 1.

Referring to FIGS. 2 and 3, the coupling means 30 is further formed with two small threaded holes 342 at the ring portion which are compatible with the small threaded hole 352 of the blocking plate 35. A screw 353 is threaded into the threaded holes 342 and 352, thereby securing the blocking means 35 in the socket 341 and coupling the first clamping means 10 and the coupling means 30 together.

Figure 4:
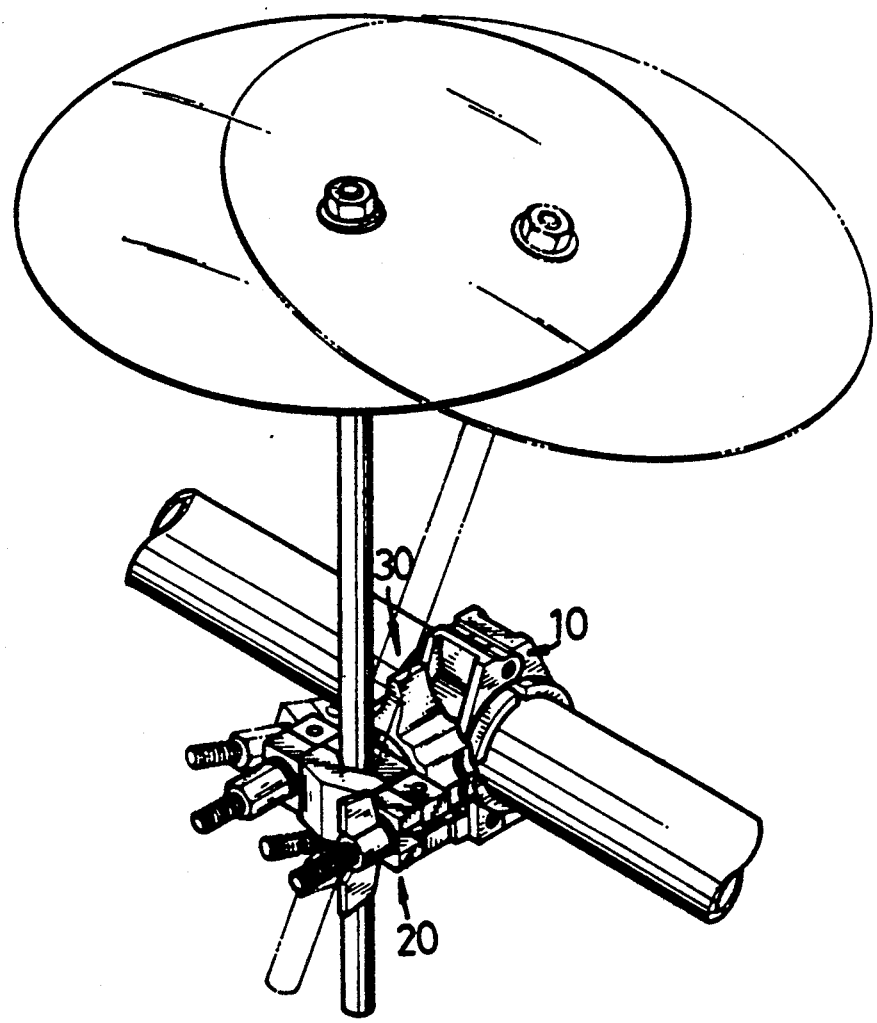
FIG. 4 is a perspective view of the clamping apparatus shown in a working embodiment in accordance with the present invention, clamping a cymbal.

Now, referring to FIGS. 2 and 4, the second clamping means 20 cooperates with the coupling means 30 by threading the threaded flange portion 24 into the receiving hole 32, such that the four banks of teeth 26 of the threaded flange portion 24 mesh with the teeth 14 of the flange portion 131 of the cylindrical socket 13, thereby engaging the first clamping means 10 and the second clamping means together and obtaining a specific axial relationship as shown in the solid line in FIG. 4. If a user (percussionist) wants to change the axial relationship of the first clamping means 10 and the second clamping means 20, the coupling means 30 is loosened and the axial relationship is adjusted between the two clamping means 10 and 20 to obtain another axial relationship as shown in phantom line in FIG. 4.

Figure 5:
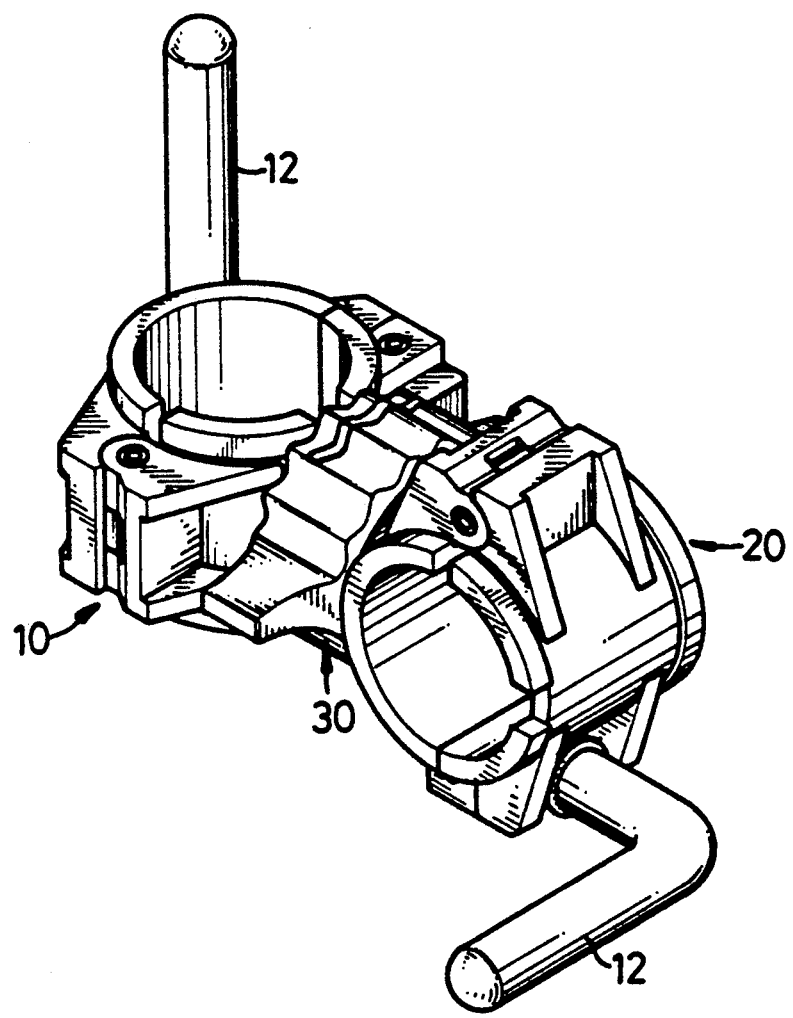
FIG. 5 is perspective view of a clamping apparatus shown in another preferred embodiment in accordance with the present invention.
Figure 6:
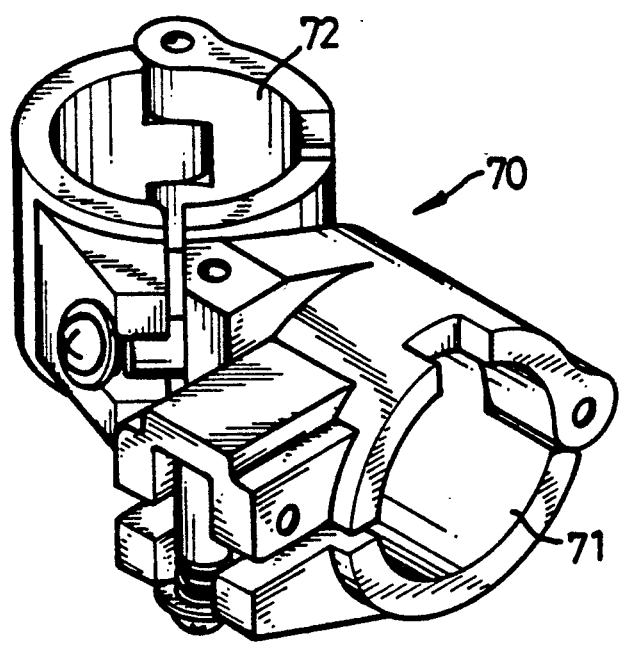
FIG. 6 is a perspective view of a conventional clamping apparatus according to prior art.

Referring to FIG. 5, a second preferred embodiment is shown, wherein the first clamping means 10 and the second clamping means 20 are substantially the same, and the coupling means 30 and the relating members of the first and the second clamping means 10 and 20 are the same as those of first embodiment.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A clamping apparatus comprising a first clamping means, a second clamping means, and a coupling means coupled therebetween for adjusting an axial relationship therebetween;
    said first clamping means having a first clamp for clamping a first external post and a cylindrical socket extending outward from a half side wall of said first clamp;
    said second clamping means having a second clamp for clamping a second external post, a threaded flange portion extending outward from a half side wall of said second clamp, and a tube member centrally extending from said threaded flange portion;
    said coupling means being substantially ring-shaped and having a threaded receiving hole formed in one side thereof for receiving said threaded flange portion of said second clamping means and adjusting an axial relationship between said coupling means and said second clamping means, and a through hole formed in the other side of said coupling means for receiving said socket of said first clamping means, thereby coupling said first clamping means and said second clamping means and adjusting an axial relationship therebetween.

2. The clamping apparatus as claimed in claim 1, wherein said cylindrical socket of said first clamping means is defined by a neck portion and a flange portion formed thereon and a chamber formed therein, said chamber receiving said tube member of said second clamping means.

3. The clamping apparatus as claimed in claim 2, wherein said flange portion of said cylindrical socket of said first clamping means has a plurality of teeth formed on an end periphery thereof.

4. The clamping apparatus as claimed in claim 3, wherein said threaded flange portion of said second clamping means has four banks of teeth formed on an end periphery thereof which are compatible with said teeth of said flange portion of said cylindrical socket of said first clamping means, such that when said coupling means is adjusted to an axial relationship between said first clamping means and said second clamping means, said teeth of said second clamping means meshing with said teeth of said first clamping means, thereby securing an axial relationship.

5. The clamping apparatus as claimed in claim 1, wherein said coupling means further comprises a slot formed in an outer wall thereof and positioned between said receiving hole and said through hole, and a blocking plate having a U-shaped cutout and being received by said slot, said U-shaped cutout substantially enclosing said neck portion of said cylindrical socket of said first clamping means when said cylindrical socket is inserted into said coupling means.

6. The clamping apparatus as claimed in claim 5, wherein said coupling means has two aligned threaded holes in both sides of said slot and a corresponding threaded hole in said blocking plate, such that when said blocking plate is received in said slot, said threaded holes receive a screw, thereby fixing said coupling means with said first clamping means.

7. The clamping apparatus as claimed in claim 1, wherein said first clamp comprises a first and a second semicircular member, a first L-shaped clamp lever, a pivot shaft engaged in one end of each semicircular member for providing a pivotal relationship therebetween, a first pivot pin embedded inside the other end of said second semicircular member for securing said first L-shaped clamp lever thereto, said lever being used to close and secure said two semicircular members together, thereby clamping an external post therein.

8. The clamping apparatus as claimed in claim 1, wherein said second clamp comprises a first and a second V-shaped member, a second and a third pivot pin formed in both ends of said second V-shaped member, and a first and a second clamp levers respectively pivoted by said second and third pins, thereby constituting a clamping shape and further clamping an external post therein.

9. The clamping apparatus as claimed in claim 1, wherein said second clamp comprises a third and a fourth semicircular members, with a second pivot shaft engaged in one end of each semicircular member for providing a pivotal relationship therebetween, a fourth pivot pin embedded inside the other end of said fourth semicircular member for securing a second L-shaped clamp lever thereto, said second lever being used to close and secure said two semicircular members together, thereby clamping an external post therein.

* * * * *